United States Patent [19]

Enomoto

[11] Patent Number: 5,428,919

[45] Date of Patent: Jul. 4, 1995

[54] SONIC SINKER

[76] Inventor: Katsuo Enomoto, 1-3-2 Senju-Higashi, Adachi-Ku, 120 Tokyo, Japan

[21] Appl. No.: 128,382

[22] Filed: Sep. 28, 1993

[30] Foreign Application Priority Data

Nov. 6, 1992 [JP] Japan .................... 4-086765 U

[51] Int. Cl.⁶ .............................................. A01K 85/00
[52] U.S. Cl. .................................................. 43/42.31
[58] Field of Search ...................................... 43/42.31

[56] References Cited

U.S. PATENT DOCUMENTS

| | | | |
|---|---|---|---|
| 3,908,298 | 9/1975 | Strader | 43/42.31 |
| 3,987,576 | 10/1976 | Strader | 43/42.31 |
| 4,008,539 | 2/1977 | Gardner | 43/42.31 |
| 4,287,679 | 9/1981 | Klotz | 43/42.31 |
| 4,969,287 | 11/1990 | Johnson | 43/42.31 |
| 4,995,189 | 2/1991 | Crihfield | 43/42.31 |

*Primary Examiner*—Kurt Rowan
*Attorney, Agent, or Firm*—Rosen, Dainow & Jacobs

[57] ABSTRACT

A sonic sinker connected to a fish line of a fishing tackle in order to positively and selectively fish up black bass. The sonic sinker comprises a sinker main body formed of free cutting brass. An air chamber maintaining a water-tight seal is formed inside the sinker main body. A pipe-shaped section is provided within the air chamber and extending vertically to across the air chamber. A ring-shaped member is movably disposed with the air chamber and located around the pipe-shaped section so as to be vertically and laterally movable. The ring-shaped member is formed of free cutting brass and strikable against the inner wall of the sinker main body upon vibration of the sinker main body, thereby generating melodious sound to be emitted outside of the sinker main body.

3 Claims, 5 Drawing Sheets

SONIC SINKER

BACKGROUND OF THE INVENTION

1. Field of the Invention

This invention relates to a sinker of fishing tackle, and more particularly to a sonic sinker which generates a mode sound in water.

2. Description of the Prior Art

As shown in FIG. 10, a conventionally used general fishing tackle includes a fishing rod 21', a fishline 22', a float 23', a sinker 25' located under and connected to the float 24', a fishing hook 26', and the like. The sinker 25' sinks in water 27' to provide a directivity to the hook 26' and the like. The fishing tackle which generates sound is delightedly accepted by fishermen as if a wind-bell provides a fresh feeling to people in summer. In other words, a fisherman can feel a supreme comfortableness during preparation or the like of fishing which requires concentration of mind under the effect of melodious sound getting into the fisherman's ears. In view of this, a fishing tackle provided at a part thereof with a sound generating body has been conventionally employed. For example, there are one in which a plurality of beads are connected to a fishline so that sound having a tone quality is generated under contact of the beads, and one in which blades formed of leaf-like metal members are hung down from the fishline 22' so that rubbing is made among the blades to generate sound. Additionally, there are also one in which the float itself is formed of a sound generating body, and one in which the float is provided with a sound generating member.

The propagation speed of an acoustic wave is higher in water than in air. Additionally, in general, a sound generated in air is diffused and therefore difficult to be heard in water. As a result, there is the frequent possibility that the sound generated is difficult to enter water under the effect of reflection and refraction on the water surface in case of the above-mentioned one in which the float is provided with the sound generating body or in case of the above-mentioned one in which the float itself is formed of the sound generating body. Although a sound propagates rapidly in water, it is attenuated by water flow and the like and therefore the sound is difficult to propagate if the sound is not relatively high in frequency. In this regard, the sound generated from the one in which the float itself is provided with the sound generating body is difficult to propagate in water. Additionally, the sound generated upon rubbing among the blades in water cannot become a clear sound under the action of resistance of water. Furthermore, the conventional sound generating body has a problem in which there is a tendency that water comes thereinto.

By the way, fishes are sensitive living beings so as to recognize the sound of human's footsteps, the sound of a screw propeller, and the like. Accordingly, it is usual that fishes get away when such sounds are generated. However, there are sounds having frequencies and tone qualities which fishes like. Therefore, it has been experimentally gotten that by generating sounds which fishes like, fishes come near so that fishing a large number of fishes is made possible. Particularly, a fish called "black bass" like sounds so as to be frequently caught by a fishing tackle which generates sounds. The black bass is a large-sized fish having a body length of around 30 cm so as to have a strong fishline drawing force and provide a feeling of pleasure when it is fished up. Such large-sized fishes as the black bass and the like eat relatively small-sized fishes and fries, and therefore the small-sized fishes and the likes are eaten by black bass thereby reducing an aquatic source. In order to protect the aquatic source, it is necessary to selectively fish up the large-sized fished life black bass. Additionally, black bass is a fish which is like sea bass and has a delicate flavor, and therefore it is very suitable for food and can be sufficiently consumed if a large number of it is fished up.

SUMMARY OF THE INVENTION

It is an object of the present invention to provide an improved sonic sinker which can overcome drawbacks encountered in conventional sinkers of fishing tackles.

Another object of the present invention is to provide an improved sonic sinker by which a fisherman can effectively fish up a large number of fishes, particularly black basses, providing a feeling of pleasure of fishing to the fisherman.

A further object of the present invention is provide an improved sonic sinker which can generate sounds having various tone qualities which change to form a melodious sound even when the sinker is dipped in water.

A still further object of the present invention is to provide an improved sonic sinker in which a metallic sound generating member is stored in an air chamber filled with air and maintaining a water-tight seal.

A sonic sinker of the present invention is connected to a fish line and comprises a sinker main body. An air chamber is formed within the sinker main body. Additionally, a solid member is movably disposed within said air chamber. The solid member may be a ring-shaped member. The ring-shaped member is preferably formed such that its thickness gradually decreases in a direction from its central portion to its outer peripheral portion. The sinker main body and ring-shaped member are preferably formed of brass.

Accordingly, when the sonic sinker is connected to the fishline, it is vibrated in water under the action of water flow and movement of the fishline. Additionally, the sonic sinker is well vibrated when a fisherman makes the upward and downward movements of a fishing rod and draws the fishline on trial as a fisherman's regular custom. As a result, the solid or ring-shaped member located within the air chamber moves vertically and laterally, and strikes against the inner wall of the sinker main body thereby generating sounds. The tone quality of the sounds delicately changes owing to the striking position of the ring-shaped member against the sinker main body. Additionally, special comfortable sounds are generated owing to the ring shape itself of the ring-shaped member. The ring-shaped member can be formed small-sized and preferably formed of brass so that it can be produced at high accuracy and in any shape. The sounds emitted from the sonic sinker is released into air and transmitted as pleasant metallic sounds to the ears of the fisherman preparing a fishing tackle thereby increasing an interesting mode. In the middle course of sinking the sonic sinker in water, black bass gathers around together with general fishes under generation of the sounds from the sonic sinker. Since black bass is a large-sized and strong fish, it pushes other fishes aside and gathers around the sonic sinker at the head of them, thereby making possible selectively fishing up a large number of black basses. Furthermore, if an artificial bait is connected to the sonic sinker, black bass makes such a hallucination that sounds are being generated from the artificial bait, so that it bites the artificial bait. As a result, more black basses can be fished up.

BRIEF DESCRIPTION OF THE DRAWINGS

In the drawings, like reference numerals designate like parts and elements throughout all the figures, in which.

DETAILED DESCRIPTION OF THE INVENTION

Figure 1:
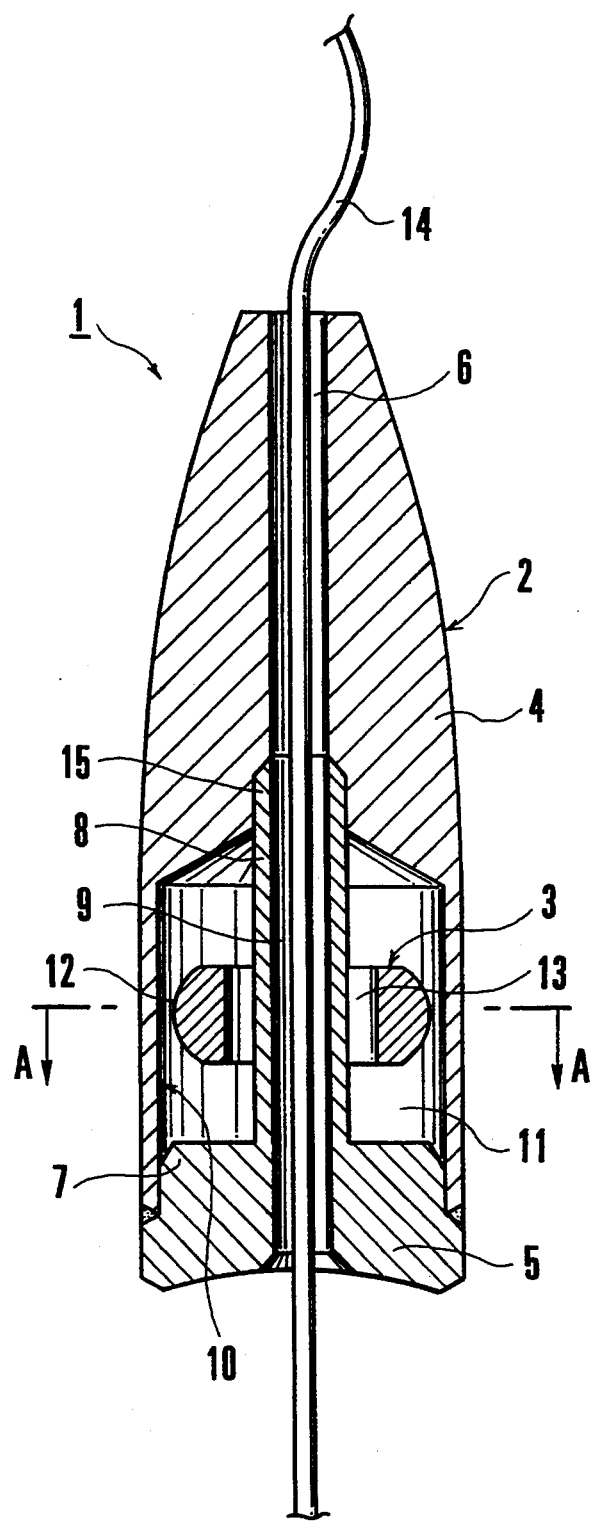
FIG. 1 is a vertical sectional view of an embodiment of a sonic sinker in accordance with the present invention.

Referring now to FIGS. 1 to 4, more specifically FIG. 1, there is shown an embodiment of a sonic sinker 1 according to the present invention. The sonic sinker 1 comprises a sinker main body 2, and a ring-shaped member 3. The main body 2 includes an upper side sinker member 4 which is generally projectile-shaped in external appearance. The upper side sinker member 4 is formed with an inner hollow defined by an inner wall 10, at its lower section which is generally cylindrical. The inner hollow is opened at the bottom end of the upper side sinker member 4. An extended fishline hole 6 is formed at the upper section of the upper side sinker member 4 in a manner to connect the inner hollow and the tip end of the upper side sinker member 4. The fishline hole 6 extends along the longitudinal center axis of the projectile-shaped upper side sinker member 4, and is opened at the tip end of the upper side sinker member 4. A fishline 14 is located and extends through the fishline hole 6.

A lower side sinker member 5 is combined with the upper side sinker member 4. More specifically, the lower side sinker member 5 includes a lower lid section 7 which is fitted in the opened bottom end of the upper side sinker member 5. A projecting section 8 is formed integral with the lower lid section 7 and projects upwardly along the longitudinal center axis (not shown) of the upper side sinker member 5. The projecting section 8 is formed with an extended a fishline hole 9 extending along the longitudinal center axis of the upper sinker member 4, so that the projecting section 8 is generally pipe-shaped. The projecting section 8 is located inside the inner hollow of the upper side sinker member 5 in such a manner that its upper tip end is fixed to the bottom portion of the upper section so that the fishline holes 6, 9 are connected and aligned with each other. An air chamber 11 maintaining an air-tight seal is formed between the inner wall 10 of the upper side sinker member 4 and the projecting section 8 of the lower side sinker member 5 by fitting and fixing the lower lid section 7 of the lower side sinker member 5 into the opened bottom end of the upper side sinker member 5. In this embodiment, the sinker main body 2 and the ring-shaped member 3 are formed of free cutting brass.

Figure 2:
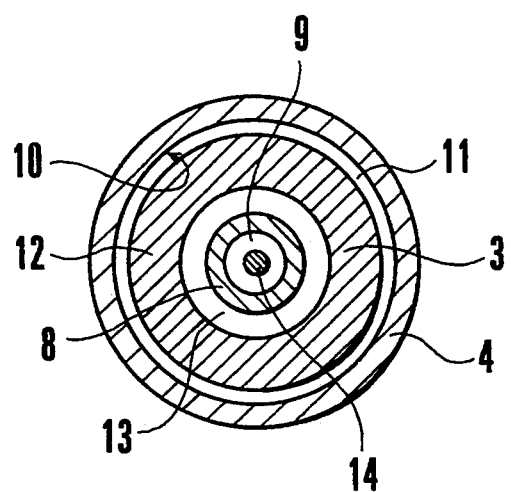
FIG. 2 is a transverse sectional view taken in the direction of arrows substantially along the line A—A of FIG. 1.
Figure 4:
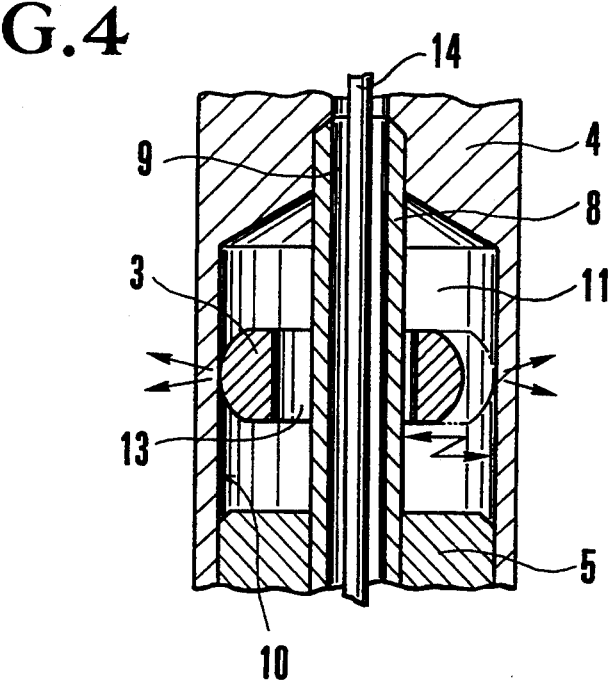
FIG. 4 is a fragmentary vertical sectional view similar to FIG. 3 but illustrating another sound generating action (in a lateral direction) of the sonic sinker of FIG. 1.

As shown in FIGS. 1 and 2, the ring-shaped member 3 is formed ring-shaped to have an inner hole 13 and movably disposed in the air chamber 11 in a manner that the projecting section 8 is located in and passes through the inner hole 13. The outer diameter of the ring-shaped member 3 is slightly smaller than the inner diameter of the lower section (i.e., the diametrical distance of the inner wall 10) of the upper side sinker member 4. For example, the ring-shaped member 3 is formed so as to have an outer diameter smaller by about 1 mm than the inner diameter of the cylindrical lower section of the upper side sinker member 4. As mentioned above, the ring-shaped member 3 is loosely fitted around the projecting section 8. It is to be noted that the ring-shaped member 3 has such dimensions that the inner peripheral portion (defining the inner hole 13) thereof cannot come into contact with the outer peripheral surface of the projecting section 8 even when the outer peripheral portion thereof comes into contact with the inner wall 10 under a horizontal state of the ring-shaped member 3 as shown in FIG. 4. In this embodiment, the outer peripheral surface of the ring-shaped member 3 is formed arcuate in cross-section as shown in FIG. 1. Accordingly, the ring-shaped member 3 has top and bottom annular flat surfaces (no numerals), in which at least bottom annular flat surface has an outer diameter smaller than that of an axially central section of the ring-shaped member 3. As discussed above, the ring-shaped member 3 is formed of free cutting brass.

Since the upper side and lower side sinker members 4, 5 are formed of free cutting brass as discussed above, they are high in cuttable ability so that no burr is formed on the outer peripheral surface and inner wall 10, fishline holes 6, 9 and the like of the sinker members 4, 5. Additionally, the free cutting brass is larger in specific gravity than iron, and therefore the upper side and lower side sinker members 4, 5 are formed smaller by an amount corresponding to the difference in specific gravity between the brass and the iron. As a result, even a soft fishline (so-called a light line) cannot be damaged. Furthermore, a baking finish is applied on the outer peripheral surface of the sinker main body 2, so that a coating film formed on the sinker main body 2 is difficult to be peeled off, providing a beautiful finished external appearance. It is a matter of course that the coating film may have a variety of colors. Moreover, as shown in FIG. 1, the tip end portion of the projecting section 8 of the lower side sinker member 5 is fixedly fitted in an annular fitting groove or depression 15 formed in the upper side sinker member 4 in a manner to maintain water-tight and air-tight seals as shown in FIG. 1. Therefore, no water penetrates into the air chamber 11 so as to maintain a complete water-tight seal for the air chamber 11. The fishline 14 passes through the fishline holes 6, 9 of the sinker main body 2 as shown in FIG. 1.

Subsequently, the manner of operation of the sonic sinker 1 of this embodiment will be discussed with reference to FIGS. 3 and 4.

Figure 3:
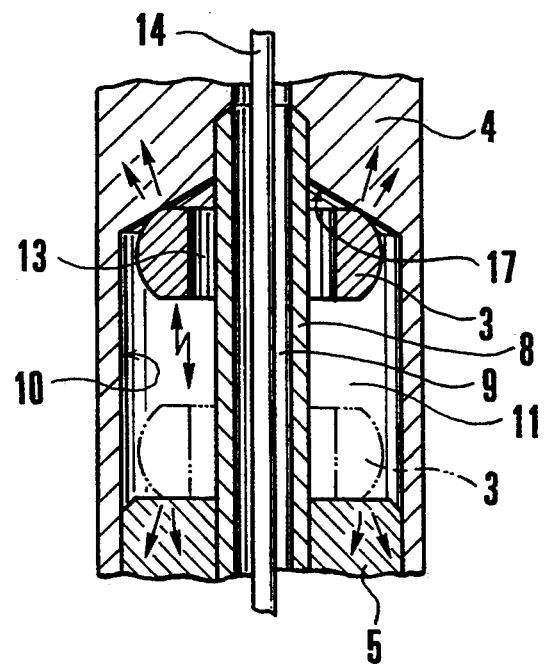
FIG. 3 is a fragmentary vertical sectional view of the sonic sinker of FIG. 1, illustrating a sound generating action (in a vertical direction) of the sonic sinker.

As shown in FIG. 3, since the ring-shaped member 3 is movably disposed within the air chamber 11 of the sinker main body 2, it moves upwardly and downwardly under the action of inertial force caused by upward and downward vibration of the sinker main body itself. When the ring-shaped member 3 moves upwardly, it strikes against the inclined or generally frusto-conical wall surface 17 (defining the top part of the air chamber 11) of the bottom portion of the upper side sinker member 4 as indicated by solid lines in FIG. 3 thereby generating sounds like "kacha kacha". When the ring-shaped member 3 moves downwardly, the relatively small diameter bottom surface of the ring-shaped member 3 strikes against the lower side sinker member 5 as indicated in phantom in FIG. 3 thus generating "kacha kacha" sounds which are different from the similar sounds generated under the upward movement of the ring-shaped member 3. The sounds echo within the air chamber 11 and are emitted through the wall of the sinker main body 2 to the outside.

As shown in FIG. 4, when a lateral vibration is applied to the sinker main body 2, the ring-shaped member 3 moves laterally to strike against the inner wall 10, taking states indicated by solid lines and in phantom. By this, sounds having the tone quality of "sara sara" are generated and similarly echoed within the air chamber 11, and then emitted to the outside.

The ring-shaped member 3 not only makes its simple vertical or lateral movement shown in FIGS. 3 and 4 but also simultaneously makes its vertical and lateral movements, thus generating sounds having a tone quality different from that of the sounds due to the simple vertical or lateral movement.

Figure 7:
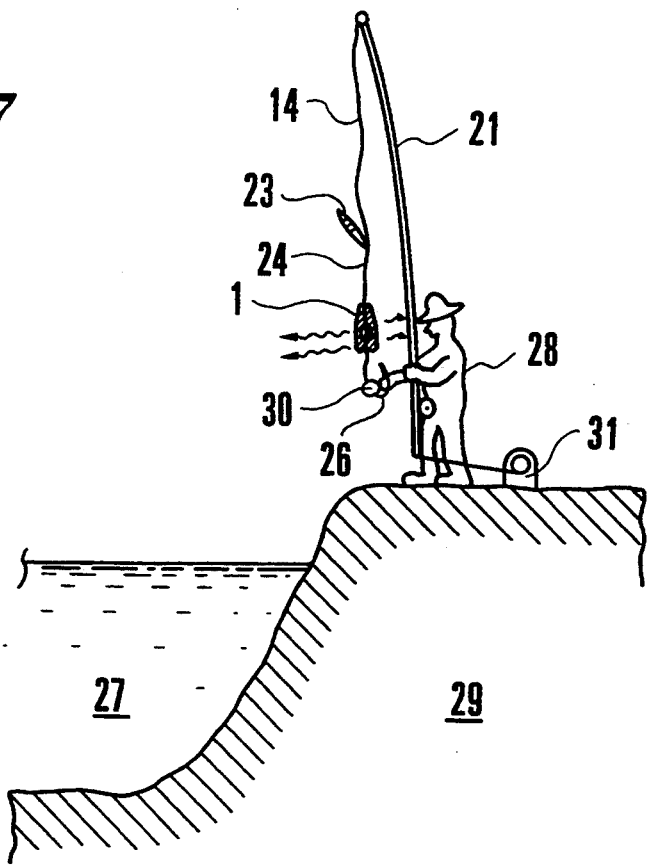
FIG. 7 is an illustration showing a condition in which a fisherman's interest of fishing is increased by the sonic sinker of the present invention.

As shown in FIG. 7, the sonic sinker 1 is installed to a fishline part 24 located under the float 23. A fisherman 28 attaches a bait 30 to a fishing hook 26 on the surface of a rock 29 aside water 27 and makes the preparation operation of connecting the fishline 14 to a reel 31. At this time, the fishline 14 swings and therefore the sonic sinker 1 vibrates. Consequently, metallic sounds such as "kacha kacha" and "sara sara" are generated as mentioned above. These sounds are melodious sounds having a tone quality like that of sounds from a wind-bell, and transmitted through air to reach the ears of the fisherman 28, thereby increasing the interest of the fisherman.

Figure 8:
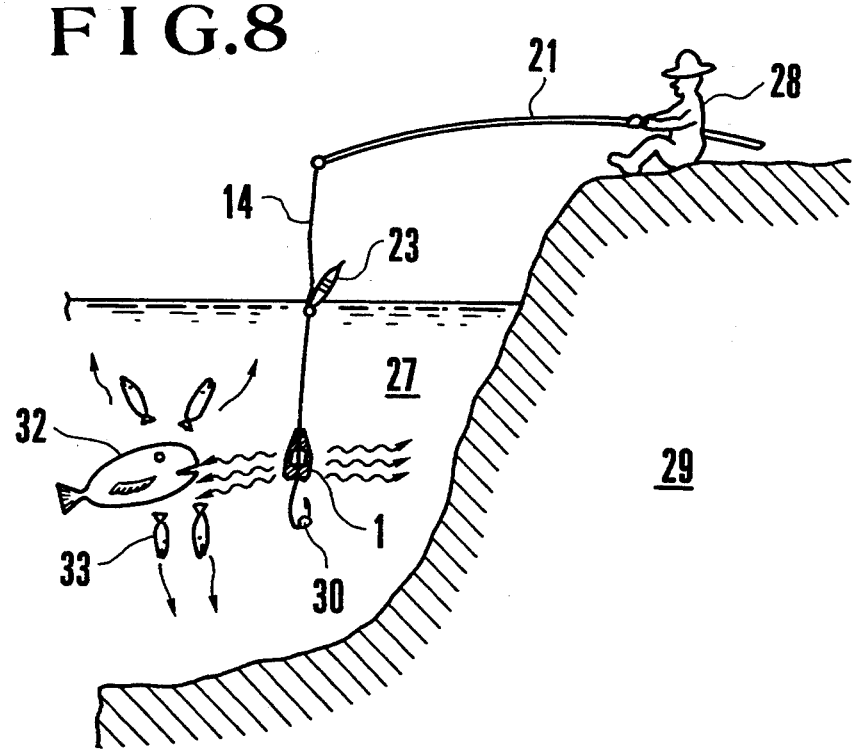
FIG. 8 is an illustration showing a condition in which a black bass is fished up by the fisherman.

As shown in FIG. 8, in the middle course of a fishing, the fishline 14 and the sonic sinker 1 vibrate owing to water flow and the like. Along with this, the sonic sinker 1 generates the metallic sounds such as "kacha kacha" and "sara sara" as same as discussed above. These metallic sounds propagate at a high speed of about 1500 m/s in water and excite the sense of hearing of black bass 32 and other fishes 33. The black bass 32 and other fishes 33 gather around the sonic sinker 1 under the action of the sounds from the sonic sinker 1, in which black bass 32 which is large in body length and strong push other small fishes 33 aside and comes near the sonic sinker 1 at the head of them to bite the bait 30.

Thus, black bass 32 is positively and selectively fished up.

Figure 9:
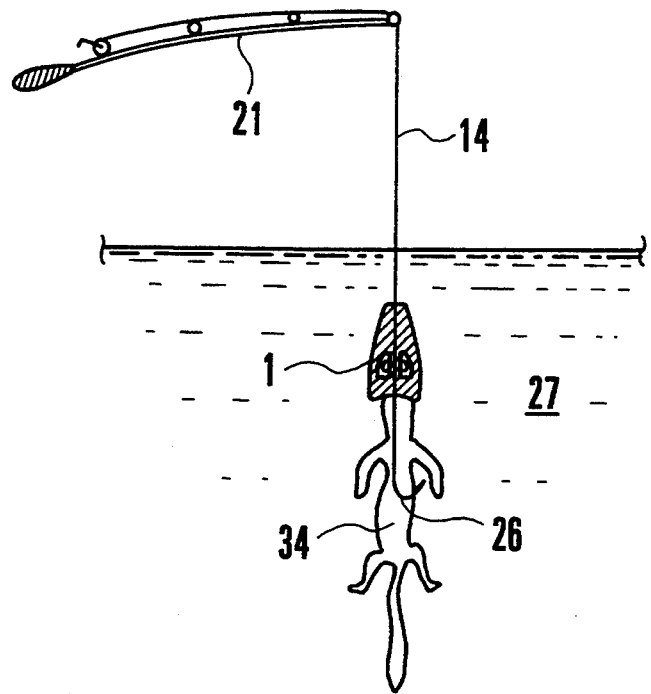
FIG. 9 is an illustration showing a state in which an artificial bait is connected to the sonic sinker of FIG. 1.
Figure 10:
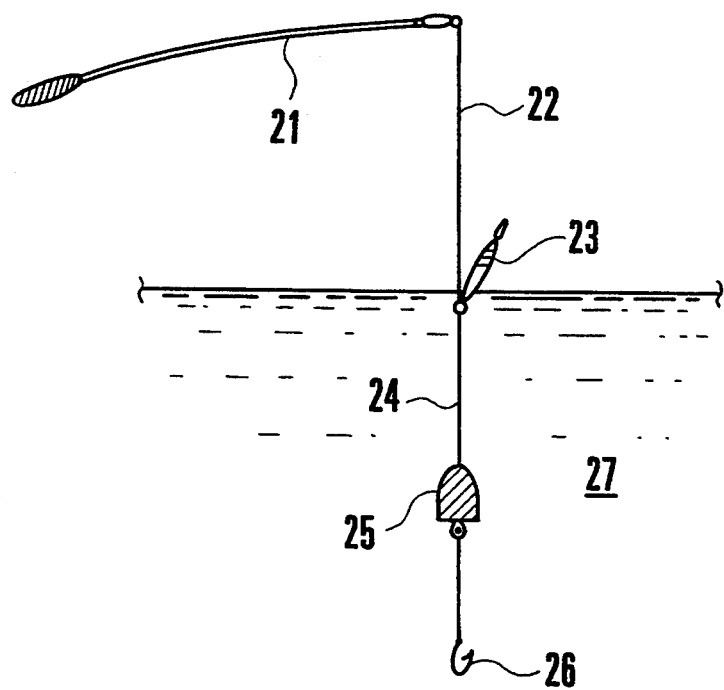
FIG. 10 is an illustration showing a general structure of a conventional usual fishing tackle.

It will be understood that as shown in FIG. 9, a lizard-like artificial bait 34 may be connected to the sonic sinker 1 connected to the tip end side of the fishline 14 of the fishing tackle. The artificial bait 34 is not limited to the lizard-like one and therefore is preferably one which black bass 32 likes. Installing the artificial bait 34 to the hook 26 makes unnecessary a living bait. With the above-discussed arrangement, a hallucination is made as if sounds are generated by the artificial bait 34. When the artificial bait 34 is sunk into water, black bass 32 misunderstands the artificial bait as a living bait and bites the artificial bait 34 upon being attracted by the sounds generated from the vicinity of the artificial bait 34. As discussed above, the sonic sinker 1 makes possible fishing up more black basses 32.

Figure 5:
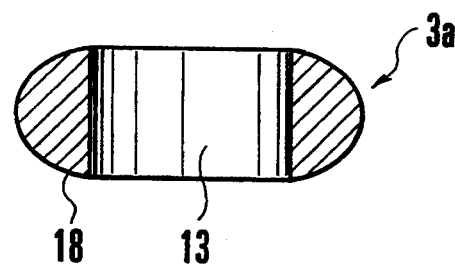
FIG. 5 is a vertical sectional view of a modified example of a ring-shaped member used in the sonic sinker of FIG. 1.

FIG. 5 illustrates a modified example of the ring-shaped member 3, so that the modified ring-shaped member is denoted by the reference numeral 3a. It will be understood that the modified ring-shaped member 3a may be used in place of the ring-shaped member 3 in the embodiment of FIGS. 1 and 2. In this example, the ring-shaped member 3a is formed such that the thickness dimension gradually decreases in a direction from the central portion toward the outer peripheral portion of the ring-shaped member 3a. In other words, the ring-shaped member 3a is generally semi-circular in cross-section as clearly shown in FIG. 5. Additionally, the outer peripheral surface of the ring-shaped member 3a is formed rounded. With the above-discussed arrangement, a flat surface portion of the bottom surface of the ring-shaped member 3a becomes very small or none. It will be understood that although no water penetrates into the air chamber 11, there is the possibility that condensed water drop attaches to the top surface of the lower lid section 7 of the lower side ring member 5. Accordingly, if the ring-shaped member 3, 3a has a wide bottom flat surface, the bottom flat surface of the ring-shaped member 5 will stick through the water drop on the upper surface of the lower lid section 7 of the lower side sinker member 5 thereby making difficult to generate sounds. This problem can be effectively solved by the ring-shaped member 3A of this example. It will be understood that sounds having a tone quality different from that of the arrangement of FIG. 5 can be generated by changing the outer peripheral shape of the ring-shaped member 3a.

Figure 6:
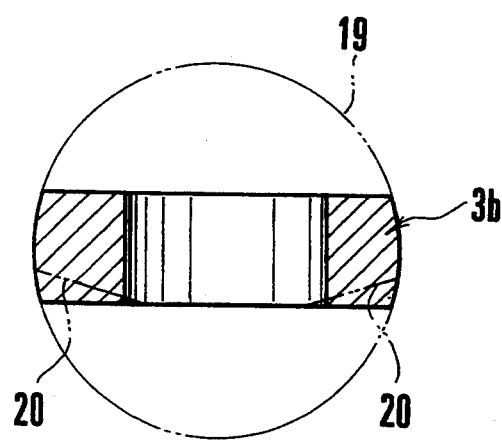
FIG. 6 is a vertical sectional view of another modified example of the ring-shaped member used in the sonic sinker of FIG. 1.

FIG. 6 illustrates another modified example 3b of the ring-shaped member 3. The ring-shaped member 3b is formed by cutting a spherical body 19, thereby facilitating production of the ring-shaped member 3b. In this case, in order to minimize or remove the bottom flat surface portion of the bottom end of the ring-shaped member 3b, it is preferable to form an inclined or generally frusto-conical surface 20 at the bottom end of the ring-shaped member 3b. In other words, an inclined surface is formed by cutting an annular part (having a generally triangular cross-sectional shape) from the bottom end section of the ring-shaped member 3b.

While the ring-shaped members 3, 3a, 3b have been shown and described as being used in the embodiment of the present invention, it will be understood that the shape of them is not limited to ones shown and described.

It will be appreciated that, according to the above embodiment, the ring-shaped member 3, 3a, 3b is formed considerably small-sized thereby rendering small-sized the whole body of the sonic sinker 1.

While the upper side sinker member 4 has been shown and described as being projectile-shaped, it will be understood that the shape of the upper side sinker member 4 is not limited to the projectile shape and therefore may take a variety of shapes.

Although only one ring-shaped member 3, 3a, 3b has been shown and described as being disposed within the air chamber 11, it will be appreciated that the number of the ring-shaped member is not limited to one and therefore a plurality of ring-shaped members may be disposed within the air chamber 11.

It will be appreciated that the artificial bait shown in FIG. 9 is not limited to the lizard-like one, and therefore a variety of shapes of artificial bite may be used.

Hereinafter, advantageous effects of the above-discussed embodiment will be summarized as follows:

(1) Melodious sounds caused by striking of the ring-shaped member within the air chamber of the sonic sinker are transmitted to the ears of the fisherman who is preparing the fishing tackle, thereby increasing the interest of the fisherman thus obtaining an increased mode of fishing and a delight.

(2) Fishes gather around the sonic sinker since sounds in water propagate at a speed of about 5 times that in air, and fishes like melodious sounds. As a result, a large number of fishes can be fished up. Particularly, black bass likes sounds and comes near the sonic sinker pushing other fishes aside, and therefore black bass can be positively and selectively fished up. As one experimental example, the following data were recorded: When fishing was made at the same place and for the same time by a professional fisherman who did not use the sonic sinker (of the present invention) and by an amateur fisherman who used the sonic sinker (of the present invention), the professional fisherman could fish up no fish; however, the amateur fisherman fished up about 5 black basses.

(3) Black bass eats a large number of other small fishes. Therefore, fishing black bass makes plentiful an aquatic source of other fishes.

(4) Black bass is a fish of a delicate flavor and therefore is delightedly eaten by a man who likes eating fish.

(5) Black bass is long in body length, and therefore a fisherman can feel strongly the real taste of fishing upon the drawing condition of the fishline and the fishing-up of black bass.

(6) By virtue of using the ring-shaped member and using the brass as the material of the member, a plurality of comfortable sounds having different tone qualities can be generated thereby obtaining a further advantageous effect.

(7) By virtue of using the brass as the material, the sonic sinker is prevented from rusting or the like thereby protecting the fishline from being damaged. The brass is high in cuttable ability thereby improving the external appearance of the sonic sinker. Additionally, since the brass is larger in specific gravity than iron, the sonic sinker can be formed smaller-sized by an amount corresponding to the difference in specific gravity.

(8) Since the ring-shaped member generates sounds even if it is very small-sized, the whole body of the sonic sinker can be made small-sized. In this regard, a fisherman likes and delightedly accepts a light-weighted and small-sized sinker.

(9) A baking finish or the like can be applied on the outer surface of the sonic sinker, thereby improving the external appearance of the sonic sinker.

(10) The inside of the sonic sinker is sealed to maintain a complete waterproof, and therefore it can be prevented from generating no clear sound.

(11) The ring-shaped member is formed such that its thickness gradually decreases in the direction from the central part to the peripheral part, and employs such a shape that the area of the flat bottom surface of the ring-shaped member is minimized. As a result, generation of sounds cannot be impeded by attaching of the ring-shaped member to the sinker main body through water drop and the like which have condensed in the air chamber.

(12) When the artificial bait is connected to the sonic sinker, fishes make such a hallucination that sounds are generated from the artificial bait and a misunderstanding of the artificial bait as a living bait. Accordingly, a fisherman can fish up more fishes, particularly black basses.

What is claimed is:

1. A sonic sinker connected to a fish line, comprising:
a sinker main body formed of brass;
means defining an air chamber in said sinker main body, said air chamber being filled with air and maintaining a water-tight seal, said air chamber including a thin cylindrical side wall forming part of said sinker main body;
a ring-shaped member formed of brass and movably disposed within said air chamber; and
rod means fixedly disposed within said air chamber and forming part of said sinker main body, said ring-shaped member being slidably movably disposed around said rod means so as to be movably vertically and laterally within said air chamber thereby allowing said ring-shaped member to strike against said thin cylindrical side wall of said sinker main body;
wherein said ring-shaped member has a cylindrical central hole in which said rod means is located, said cylindrical central hole being defined by an inner periphery coaxial with an outer periphery of said ring-shaped member, said ring-shaped member having first and second ends which are axially separate from each other, said ring-shaped member having a cross-sectional area which gradually decreases in a direction from an axially central portion to each of said first and second ends, said cross-sectional area being in cross-section perpendicular to the axis of said ring-shaped member.

2. A sonic sinker as claimed in claim 1, wherein said ring-shaped member has first and second flat annular surfaces which are located respectively at said first and second ends.

3. A sonic sinker as claimed in claim 1, wherein said ring-shaped member has such dimension that the inner periphery thereof is separate from said rod means even when the outer periphery thereof comes into contact with the inner surface of said thin cylindrical side wall of said sinker main body in a state in which the axis of said sinker main body and said rod means is perpendicular to said ring-shaped member.

* * * * *